United States Patent
Kent et al.

(10) Patent No.: US 10,702,888 B2
(45) Date of Patent: Jul. 7, 2020

(54) ACOUSTIC TRANSDUCER

(71) Applicant: BAE SYSTEMS plc, London (GB)

(72) Inventors: Lionel William John Kent, Chelmsford Essex (GB); Colin James Harper, Chelmsford Essex (GB)

(73) Assignee: BAE SYSTEMS PLC, London (GB)

( * ) Notice: Subject to any disclaimer, the term of this patent is extended or adjusted under 35 U.S.C. 154(b) by 386 days.

(21) Appl. No.: 15/560,927

(22) PCT Filed: Mar. 16, 2016

(86) PCT No.: PCT/GB2016/050703
§ 371 (c)(1),
(2) Date: Sep. 22, 2017

(87) PCT Pub. No.: WO2016/156791
PCT Pub. Date: Oct. 6, 2016

(65) Prior Publication Data
US 2018/0078969 A1    Mar. 22, 2018

(30) Foreign Application Priority Data

Mar. 27, 2015  (EP) .................................... 15275091
Mar. 27, 2015  (GB) .................................. 1505346.5

(51) Int. Cl.
*B06B 1/02*  (2006.01)
*H04B 11/00*  (2006.01)

(52) U.S. Cl.
CPC ............ *B06B 1/0207* (2013.01); *H04B 11/00* (2013.01); *B06B 2201/55* (2013.01)

(58) Field of Classification Search
CPC combination set(s) only.
See application file for complete search history.

(56) References Cited

U.S. PATENT DOCUMENTS 5,987,992 A     11/1999   Watanambe et al.
2004/0195936 A1  10/2004   Chemisky et al.
(Continued)

FOREIGN PATENT DOCUMENTS

DE    3538964 A1   5/1987
JP    S5949098 A   3/1984
(Continued)

OTHER PUBLICATIONS

English Translation DE 3538964, Herbert Ruff (Year: 1987).*
(Continued)

*Primary Examiner* — Bryan P Gordon
(74) *Attorney, Agent, or Firm* — Finch & Maloney PLLC

(57) ABSTRACT

There is disclosed an acoustic transducer for communications within an operational bandwidth, the transducer comprising:
A signal generator for generating a signal at a centre-frequency within the operational bandwidth;
A piezoelectric element having a dielectric constant that varies with temperature;
A driving electrode at the surface of the piezoelectric element;
A matching network, having a natural frequency at a given temperature, and operable to transfer the signal from the signal generator to the piezoelectric element whilst mitigating electrical loss, the matching network being connected to the driving electrode;
Wherein the matching network comprises a temperature compensating capacitor connected in parallel with the piezoelectric element, the temperature compensating capacitor being for counteracting temperature-induced changes to the dielectric constant of the piezoelectric element such that the electrical natural frequency of the transducer is substantially constant over a range of temperatures.

20 Claims, 6 Drawing Sheets

(56) References Cited

U.S. PATENT DOCUMENTS

| | | | | |
|---|---|---|---|---|
| 2004/0226378 | A1* | 11/2004 | Oda | B06B 1/0215 |
| | | | | 73/586 |
| 2007/0109073 | A1* | 5/2007 | Yamakawa | H03H 9/6493 |
| | | | | 333/133 |
| 2007/0182520 | A1* | 8/2007 | Kawakubo | H01F 21/04 |
| | | | | 336/200 |
| 2013/0109332 | A1* | 5/2013 | Aigner | H03H 9/02102 |
| | | | | 455/90.2 |

FOREIGN PATENT DOCUMENTS

| | | |
|---|---|---|
| WO | 2007091609 A1 | 8/2007 |
| WO | 2013057481 A1 | 4/2013 |
| WO | 2014098244 A1 | 6/2014 |
| WO | 2016156791 A1 | 10/2016 |

OTHER PUBLICATIONS

International Search Report and Written Opinion received for Patent Application No. PCT/GB2016/050703, dated Jun. 27, 2016. 13 pages.
International Preliminary Report on Patentability received for Patent Application No. PCT/GB2016/050703, dated Jun. 26, 2017. 9 pages.
GB Intellectual Property Office Search Report under Section 17(5) received for GB Patent Application No. 1505346.5 dated May 27, 2015. 4 pages.
Extended European Search Report, pursuant to Rule 62 EPC, received for EP Patent Application No. 15275091.5 dated Sep. 14, 2015. 9 pages.

* cited by examiner

ACOUSTIC TRANSDUCER

The present invention relates to an acoustic transducer for communications within an operational bandwidth, to an acoustic transducer communications system and method, and to a matching network for an acoustic transducer.

It is known for example from WO2013057481 to provide a data communication system comprising acoustic transducers. Each transducer can generate high frequency electrical signals and convert these into high frequency acoustic pressure waves to thereby transmit data. Further, each transducer can facilitate the conversion of high frequency acoustic pressure waves into high frequency electrical signals to thereby receive data.

Further, it is known to provide matching networks, within such an acoustic data communication system, for mitigating electric loss. In particular, a matching network is provided at each transducer in order to electrically connect a signal generator (for generating the high frequency electrical signal) to a piezoelectric unit (for generating the acoustic pressure waves).

Still further, it is known that the temperature dependent electrical response of a piezoelectric transducer can be partially mitigated by connecting a capacitor in parallel across the piezoelectric plate.

According to a first aspect of the present invention there is provided an acoustic transducer for communications within an operational bandwidth, the transducer comprising: a signal generator for generating a signal at a centre-frequency within the operational bandwidth; a piezoelectric element having a dielectric constant that varies with temperature; a driving electrode at the surface of the piezoelectric element; a matching network, having a natural frequency at a given temperature, and operable to transfer the signal from the signal generator to the piezoelectric element whilst mitigating electrical loss, the matching network being connected to the driving electrode; wherein the matching network comprises a temperature compensating capacitor connected in parallel with the piezoelectric element, the temperature compensating capacitor being for counteracting temperature-induced changes to the dielectric constant of the piezoelectric element such that the electrical natural frequency of the transducer is substantially constant over a range of temperatures.

Thus the transducer tends to provide a stable centre-frequency, irrespective of temperature changes which may occur over time at a single transducer, or which may occur differentially between a pair of communicating transducers. This stability tends to maintain the reliability of communication from a first transducer to a second transducer when deployed in varying temperature environments.

Whilst maintaining the natural frequency as substantially constant, the compensatory component may allow the natural frequency to drift provided that the electrical return loss remains −9.6 dB or less within the operational bandwidth of the transducer.

The present approach is in contrast to the known method of providing a capacitor in parallel across the piezoelectric element. To get an approximately stable temperature performance using a conventional capacitor tends to require the capacitor to have a large capacitance compared to the piezoelectric unit. Such a conventional approach tends to result in an increasingly narrow bandwidth over which the transducer can be matched to an electrical source with high efficiency.

In the present invention the capacitance of the temperature compensating capacitor can be smaller than in conventional circuits, with the result that a larger matched bandwidth for the transducer can be achieved. Thus the present approach tends to mitigate the narrowing of the bandwidth which can tend to occur in known matching circuits.

The temperature compensating capacitor may be configured such that within a certain temperature range the change in dielectric constant, in response to temperature change, is substantially equal and opposite to the change in dielectric constant of the piezoelectric element.

As such, there is provided a potentially cheap and simple means for providing the compensatory element.

The capacitance of the temperature compensating capacitor may be less than or equal to 1000 pF at 40° C.

The matching network may be tuned to substantially minimise the electrical loss over the operational bandwidth given the signal generator impedance and the capacitance of the electrode and piezoelectric element unit.

The piezoelectric may be formed from a lead zirconium titanate (PZT) material.

The natural frequency of the matching network may be substantially constant over a temperature range of at least 150° C.

The range of temperatures over which the natural frequency of the matching network is substantially constant may include −20° C.

The range of temperatures over which the natural frequency of the matching network is substantially constant may include 85° C.

By being operational at such temperatures, the transducer can be suitable for deployment in a wide range of environments. For example, the transducer may be deployed in a deep sea environment, where the temperature may be 4.5° C. Further, the transducer can thus be suitable for deployment within mechanical machinery, such as drilling equipment, where temperatures may vary between −20° C. and 90° C.

Moreover, by providing that the matched network can maintain an operational frequency regardless of temperature, it becomes possible to provide a first transducer in a first environment having a first temperature which is arranged, and because of the temperature stability is able, to communicate across an intermediate substrate with a second transducer in a second environment having a second temperature different to the first.

The acoustic transducer may have a centre-frequency between 0.5 MHz and 1.5 MHz, or in particular between 0.9 MHz and 1.1 MHz.

Such a frequency range has been found to be suited to environments where there are various dissimilar media through which the acoustic beam radiated by the transducer. As such, a transducer operating over such a frequency is suited to subsea drilling applications.

The operational bandwidth of the transducer may be at least 160 KHz

As such, the bandwidth provides sufficient channel capacity to implement a particularly stable communications protocol by means of two 80 kHz channels; each may implement a suitable protocol such as COFDM. Accordingly a bit rate in the region of 14 kbps may be achieved.

The matching network may comprise: a first shunt inductor connected in parallel with the piezoelectric unit; a second shunt inductor connected in parallel with the piezoelectric unit, and a first series inductor operably connected across the first and second shunt inductors.

Such parallel inductors tend to mitigate the dead capacitance of the temperature compensating capacitor.

The matching network may further comprise a series capacitor operably connected between the signal generator and the second shunt inductor.

Such a series capacitor tends to refine the electrical match of the transducer, particularly where the particular values of inductor that would be used are not in practice obtainable and the next closest value inductor is used.

Still further, the matching network may comprise at least two parallel inductors.

According to a second aspect of the invention there is provided an acoustic transducer communications arrangement comprising: a first acoustic transducer according to the first aspect, mounted on a first surface of a substrate; a second acoustic transducer for communications within the operational bandwidth, the transducer comprising: a signal amplifier for amplifying the signal at the centre-frequency within the operational bandwidth; a second piezoelectric element having a dielectric constant that varies with temperature; a second driving electrode at the surface of the second piezoelectric element; a second matching network, having a natural frequency at a given temperature, and operable to transfer the signal from the piezoelectric element to the signal amplifier whilst mitigating electrical loss, the matching network being connected to the driving electrode; wherein the matching network comprises a temperature compensating capacitor connected in parallel with the piezoelectric element, the temperature compensating capacitor being for counteracting temperature-induced changes to the dielectric constant of the piezoelectric element such that the electrical natural frequency of the transducer is substantially constant over a range of temperatures, and wherein the transducers are arranged such that the piezoelectric element of the first is aligned for acoustic communication with the piezoelectric element of the second.

As such there is provided a temperature-robust system for communicating data between diverse environments across an intermediate substrate. Such a system can have particular application in transferring data between different sections of machinery, deployed in different environments without compromising the integrity of intermediate structures.

For example the first transducer may be deployed amongst internal subsea drilling machinery and the second transducer deployed at the deep sea external environment of the machinery.

Alternatively, the transducers may be deployed across a nuclear reactor.

According to a third aspect of the invention there is provided a method of communication between a first environment having a first dynamic temperature range, and a second environment having a second dynamic temperature range, the environments being separated by an intermediate barrier, the method comprising: mounting a first acoustic transducer according to the first aspect of the invention in the first environment; mounting a second acoustic transducer according to the first aspect of the invention in the second environment, such that the acoustic transducers are configured to communicate with one another across the intermediate barrier.

According to a fourth aspect of the invention there is provided a matching network for an acoustic transducer, the acoustic transducer being operable to communicate at a centre-frequency and across an operational bandwidth, the acoustic transducer comprising a piezoelectric element having a dielectric constant which varies with temperature, the transducer having an electrical natural frequency at a given temperature, and being operable to transfer a signal between an electrical load and the piezoelectric element whilst mitigating electrical loss, wherein the matching network comprises a temperature compensating capacitor connected in parallel with the piezoelectric element, the temperature compensating capacitor being for counteracting temperature-induced changes to the dielectric constant of the piezoelectric element such that the electrical natural frequency of the transducer is substantially constant over a range of temperatures.

So that the invention may be well understood, embodiments thereof shall now be described with reference to the following figures, of which:

Figure 8:
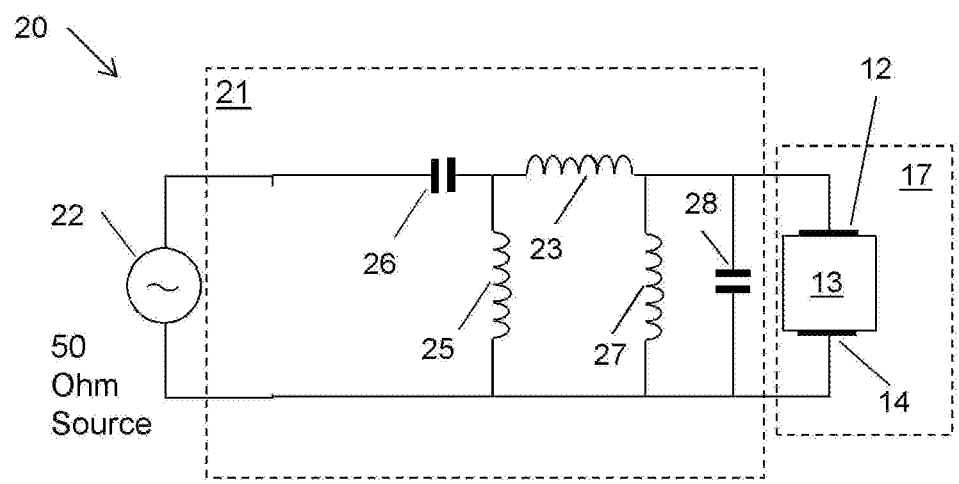
FIG. 8 is a schematic diagram of a second acoustic transducer according to the present invention, having a first centre-frequency and showing a second matching network.
Figure 10:
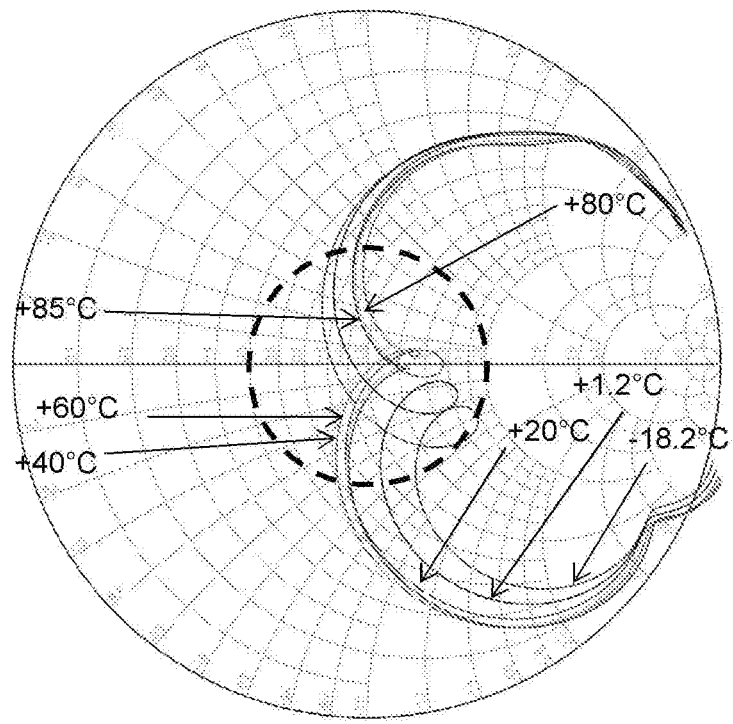
Figure 11:
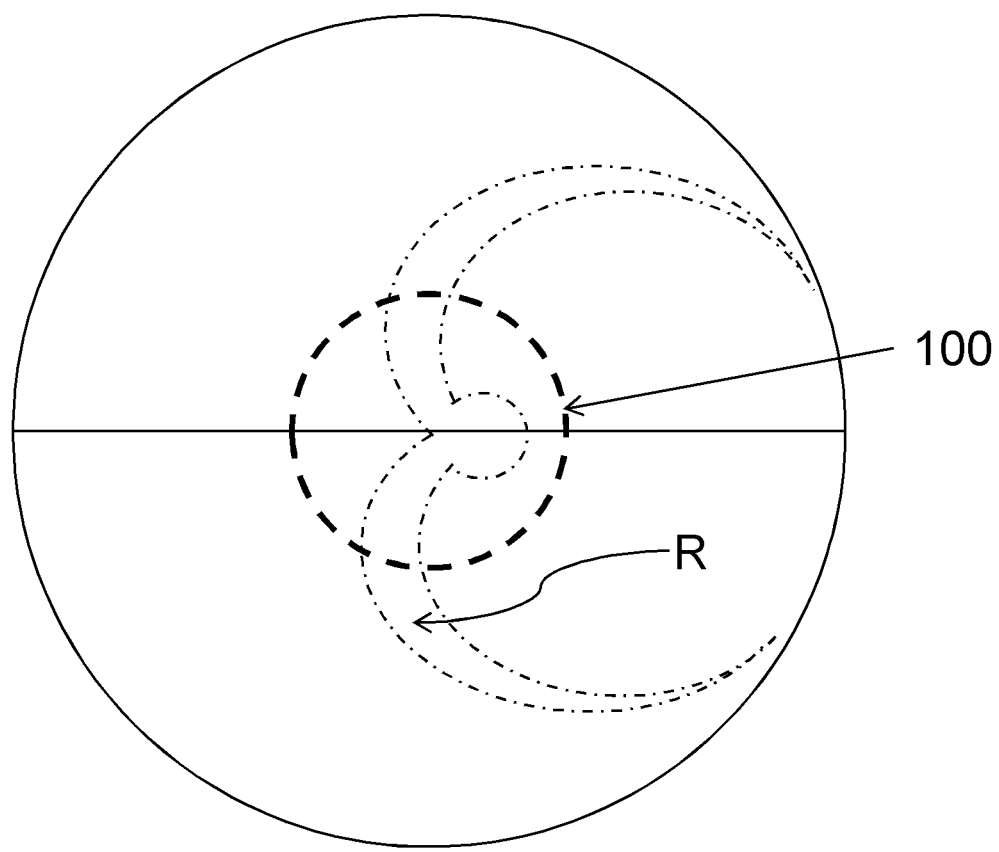

FIG. 10 is a Smith Chart plot showing temperature dispersion performance, from the simulated electrical return loss over a range of temperatures, as may be obtained using a transducer according to FIG. 8; and FIG. 11 is a Smith Chart plot showing temperature dispersion performance, from the simulated electrical return loss over a range of temperatures, as may be obtained using a transducer according to FIG. 8, with an alternative tuning.

Figure 1:
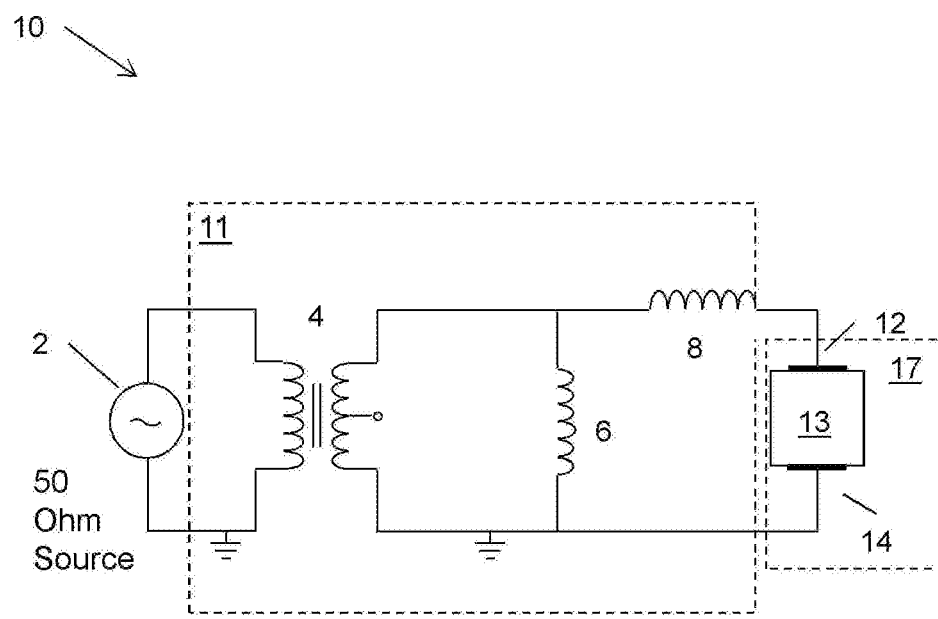
FIG. 1 is a schematic diagram of an experimental transducer for testing known piezoelectric units, the transducer operating at a reference centre-frequency and comprising a generally conventional matching network.

Referring to FIG. 1, a conventional transducer is shown generally at 10. The transducer 10 comprises a signal generator 2, a matching network 11 and a piezoelectric unit 17.

The matching network 11 comprises a transformer 4, a shunt inductor 6 and a series inductor 8.

The piezoelectric unit 17 comprises a piezoelectric element 13 sandwiched between a driving electrode 12 and a ground electrode 14.

The matching network 11 is arranged so that the transformer 4 receives the signal output from the signal generator 2. The transformer 4 feeds its own output into two parallel paths of the network 11, the first path comprising the shunt inductor 6 only, prior to the signal being grounded, the second path comprising, in sequence, the series inductor 8, the driving electrode 12, the piezoelectric element 13, and the ground electrode 14. Thus the signal generator 2 is arranged to feed an output signal into the conventional matching network 11 via the transformer 4, and the matching network 11 is arranged to feed its output signal into the piezoelectric unit 17.

The signal generator 2 is defined as having an impedance of 50Ω and is operable to generate any one of a number of signals and in particular, is able to generate a signal having a reference centre-frequency of 3.5 MHz with a bandwidth of at least 160 KHz.

Having a bandwidth of at least 160 KHz enables a pair of 80 KHz channels to be provided, which can be exploited to offer robust data communications. In particular, a Coded Orthogonal Frequency Division Multiplexing (COFDM) modulation scheme is run on each of the channels to communicate data. The overall bit rate achievable over a communications link employing such a transducer and signal modulation scheme is approximately 16 kbps.

If for example a MODBUS protocol is implemented to manage communications over the complete system of devices that communicate over the acoustic link, then this data rate will be reduced to a useful communications rate of ~12.9 kbps by the communication overheads imposed by the MODBUS protocol.

The piezoelectric element 13 is formed from a PZT ceramic of thickness 0.51 mm with an electrode dimensions 3×3 mm square. In particular the PZT material used may be PZT5A4 as supplied by Morgan Advanced Materials (Morgan Advanced Materials plc, 55-57 High Street, Windsor UK; www.morganadvancedmaterials.com).

For operation with such a 3.5 MHz reference centre-frequency and such a piezoelectric element 13, the inductance of the shunt inductor 6 is 11 pH and the inductance of the series inductor 8 is 15 pH. Further, the turns ratio of the transformer 4 is ~0.752, and as such acts to, in effect, transform the source impedance from 50 Ohms to 88.4 Ohms.

The piezoelectric element 13 has a characteristic dielectric constant for a given temperature which is known to vary with the temperature.

Figure 2:
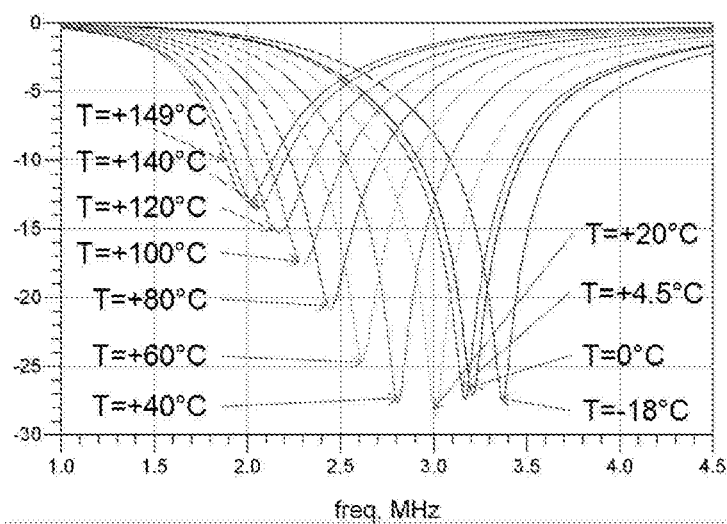
FIG. 2 is a graph showing plots of the calculated electrical return loss over a range of temperatures, for the experimental transducer of FIG. 1, the plots being derived from measured data of the piezoelectric unit response, and circuit simulations of the matching network.

Referring to FIG. 2, the effect of temperature variation on the electrical loss of the transducer 10 of FIG. 1 can be seen. The results shown in FIG. 2 are obtained not only from measured electrical impedance data of an un-tuned transducer over the planned temperature range of operation spanning −18° C. and +149° C. but also from circuit simulation of the impedance matching network 11.

As can be seen, the frequency at which minimum electrical loss occurs (i.e. the natural frequency of the transducer) varies considerably with temperature, Moreover, an overlapping frequency range for which the electrical return loss remains better than 9.54 dB at all temperatures between −18° C. and 149° C. is not achieved. An electrical return loss that remains better than 9.54 dB corresponds to a VSWR of 2:1.

At 20° C. (a nominal room temperature) the centre frequency for the 9.54 dB (2:1 VSWR) electrical bandwidth occurs at approximately 3.0 MHz At −18° C. the centre frequency for the 9.54 dB (2:1 VSWR) electrical bandwidth occurs at approximately 3.4 MHz.

At 80° C. the centre frequency for the 9.54 dB (2:1 VSWR) electrical bandwidth occurs at a frequency of approximately 2.4 MHz.

At 149° C. the centre frequency for the 9.54 dB (2:1 VSWR) electrical bandwidth occurs at a frequency of approximately 2.0 MHz.

Such a temperature instability implies that acoustic communications across a barrier between a first transducer assembly operating at a local ambient temperature of −18° C., and a second transducer assembly operating at a local ambient temperature of +150° C. would be compromised since the two transducers could not simultaneously transmit or receive signals efficiently at any given common frequency.

Figure 3:
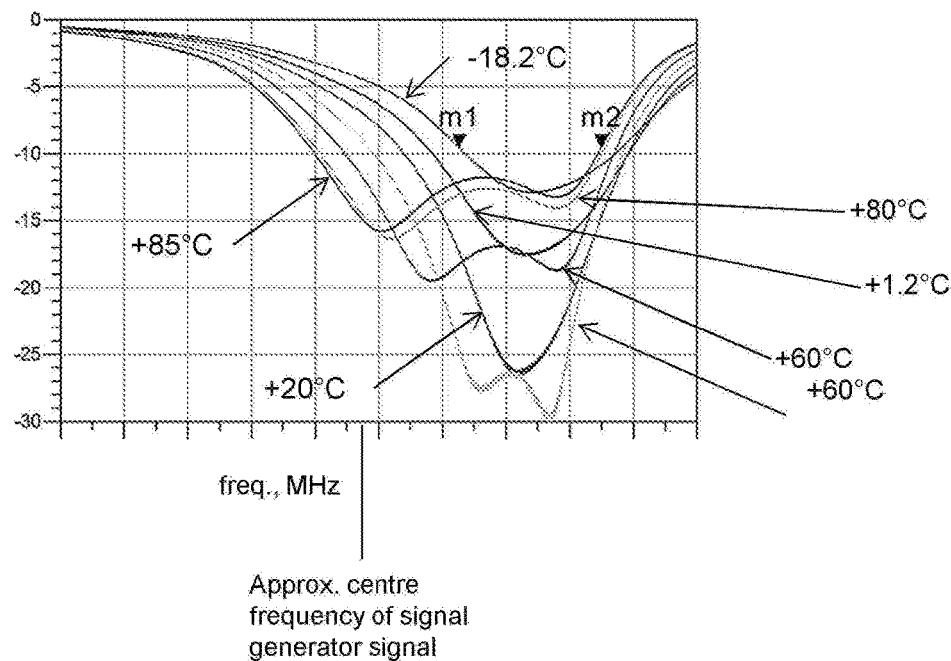
FIG. 3 is a graph showing plots of the calculated electrical return loss over a range of temperatures for the experimental transducer of FIG. 1, modified to operate at a first centre frequency, the plots being derived from measured data of the piezoelectric unit response, and circuit simulations of the matching network.

Referring to FIG. 3, the applicant has performed a further simulation of a transducer 10 equivalent to the FIG. 1 transducer but alternative insofar as the signal generator operates to generate a signal having a centre-frequency of approximately 1 MHz, and the piezoelectric element 13 is Pz27 as supplied by Meggitt Sensing Systems (Meggitt A/S, Hejrekovvej 18A, DK-3490 Kvistgaard, Denmark www.meggitt.com).

This Pz27 PZT material has lower temperature sensitivity than the PZ5A4 material considered in FIG. 2.

To tune the matching circuit 11 to these conditions, the inductance of the shunt inductor 6 is set at 23 pH, and the inductance of the series inductor 8 is set at 24 pH. The turns ratio of the transformer 4 is 1 and so the transformer 4 has no effect and may be omitted from the matching network 11 in this mode of operation. The temperature range of interest is from −18° C. to +85° C.

At 20° C. (a nominal room temperature) the centre frequency for the 9.54 dB (2:1 Voltage Standing Wave Ratio) electrical bandwidth occurs at approximately 1.3 MHz.

At −18.1° C. the centre frequency for the 9.54 dB (2:1 VSWR) electrical bandwidth loss occurs at a centre frequency of approximately 1.4 MHz.

At 85° C. the centre frequency for the 9.54 dB (2:1 VSWR) electrical bandwidth occurs at approximately 1.2 MHz.

The overlapping bandwidth where an equal to or greater than 9.54 dB (2.1 VSWR) bandwidth for the transducer is achieved at all temperatures between −18° C. to +85° C. for this particular design is approximately 223 kHz centred on 1.3 MHz.

This 223 kHz temperature independent bandwidth for this ~1.3 MHz frequency design does tend to meet the requirements of a communications system designed to operate over a pair of communications channels spanning 180 kHz between −18° C. and +85° C.

However this available bandwidth may be prone to performance degradation given likely variations in component values and manufacturing tolerances.

Further, the applicant has determined that this transducer appears unsuitable for operation over a wider range of temperatures spanning −18° C. to +149° C. This can be inferred from the Smith Chart plot shown in FIG. 4 where it can be observed in the central portion of the plot that each ~20° C. increase in temperature maps onto regularly spaced set of curves which as temperatures increase beyond ~100° C. could tend to lie outside the 2:1 VSWR circle 100.

Figure 4:
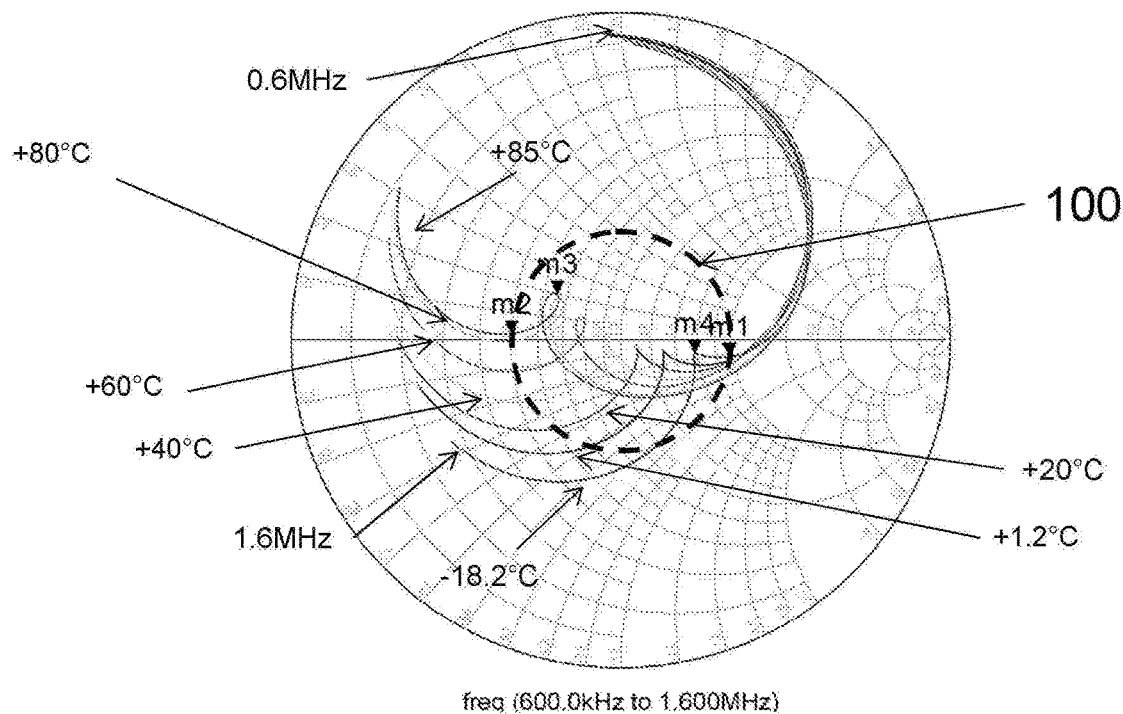
FIG. 4 is a Smith Chart plot of the electrical return loss results presented in FIG. 3.

In FIG. 4 (and indeed in later FIGS. 7 and 10) there is plotted a circle 100 centred on the (50+j0) Ω impedance point, and intersecting the (25+j0) Ω and (100+j0) Ω points. All points within this circle 100 represent complex impedance values where the electrical match will be better than 2:1 VSWR. A 2:1 VSWR is equivalent to a return loss of 9.54 dB. Any device whose electrical match falls within this 2:1 VSWR will reflect less than 11.1% of the incident power from the electrical source due to the impedance mismatch of the device under test with respect to the source impedance. For electrical matching design purposes it is a useful design target to ensure that the working bandwidth of the device falls completely within the 2:1 VSWR circle 100 to promote efficient coupling of electrical power into the piezoelectric unit.

Figure 5:
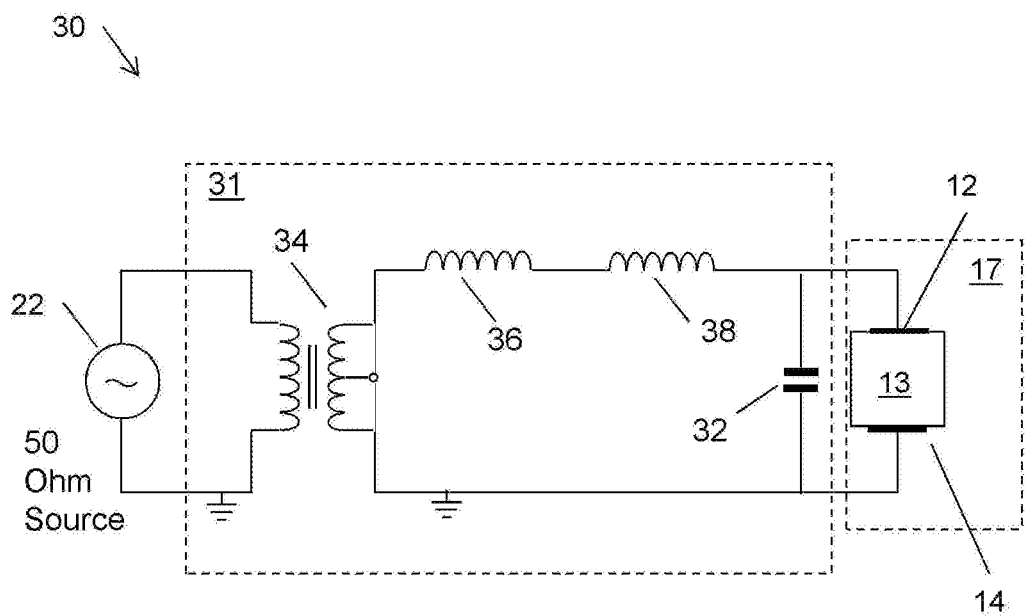
FIG. 5 is a schematic diagram of a first acoustic transducer according to the present invention, having a first centre-frequency and showing a first matching network.

Referring to FIG. 5, a transducer according to the first embodiment of the invention is shown generally at 30. The transducer 30 comprises a signal generator 22, a matching circuit 31 and a piezoelectric unit 17.

The signal generator 22 is defined as having an impedance of 50Ω and is operable to generate any one of a number of signals. In particular, signal generator 22 is operable to generate a signal having a centre-frequency of approximately 1 MHz with a bandwidth of greater than 160 KHz.

The piezoelectric unit 17 comprises a piezoelectric element 13 mounted between a driving electrode 12 and a ground electrode 14.

The matching network 31 comprises a transformer 34, a first series inductor 36, a second series inductor 38, and a shunt temperature compensating capacitor 32.

At the matching network 31, the transformer 34 is arranged to receive as input, the output from the signal generator 22. In turn, the output of the transformer 34 is fed into the series combination of the two series inductors 36 and 38. The output from the inductor 38 is subsequently fed into a parallel arrangement comprised of two paths, the first path leading to the shunt temperature compensating capacitor 32 (and then ground) the second path leading to the piezoelectric unit 17 (and then ground).

The series inductances 36, 38 and the transformer 34 of the matching network 31 are tuned to tend to maximise the electrical bandwidth over which the electrical return loss is reduced to better than 2:1 VSWR (~9.54 dB) given the impedance of the signal generator 22, the desired centre-frequency and bandwidth of the overall transducer 30, the impedance of the electrodes 12, 14, and the impedance of the piezoelectric element 13.

In this particular embodiment, the temperature compensating capacitor 32 has a capacitance of approximately 280 pF (at 40° C.) and the inductance of the first series inductor 36 and the inductance of the second series inductor 38 are tuned (as would be known to the skilled man) to the desired centre frequency.

The temperature compensating capacitor 32 comprises a N5600 dielectric. Such a dielectric has an especially high negative temperature coefficient; dielectric materials with similar properties would be suitable alternatives. Such a temperature compensating capacitor 32 using N5600 dielectric material may be of the type supplied by Capax Technologies Inc 24842 Avenue Tibbits, Valencia, Calif., USA; www.capaxtechnologies.com.

The first series inductor 36 may be of the type manufactured by Coilcraft. The second series inductor 38 may be of the type manufactured by Coilcraft.

The temperature compensating capacitor 32 operates such that, if a temperature change of x ° C. causes the dielectric constant of the piezoelectric element 13 to increase and thus causes the capacitance of the piezoelectric element 13 to increase by y pF then that temperature change of x ° C. will tend to decrease the dielectric constant of the capacitor 32 and hence its capacitance will decrease by approximately y pF Conversely if a temperature change of x ° C. causes the dielectric constant of the piezoelectric element 13 to decrease and thus causes the capacitance of the element 13 to decrease by y pF then the temperature change of x ° C.

will tend to increase the dielectric constant of capacitor 32 and hence its capacitance will increase by approximately y pF.

As is known, for capacitors 1, 2 . . . and n arranged in parallel, and having respective capacitances $C_1, C_2 \ldots C_n$, the overall capacitance is $C_{total}=C_1+C_2+C_n$. Thus it can be seen that for the second path in the matching network 31, because the shunt capacitance 32 is arranged in parallel with the electrode/piezoelectric unit 17, the overall capacitance will remain approximately constant.

The provision of the temperature compensating capacitor 32 has been facilitated through the applicant realising that the piezoelectric unit 17, has some characteristics similar to a capacitor whose capacitance varies with temperature.

The relative dielectric constant of a typical Pz27 platelet, such as may comprise piezoelectric element 13, is approximately equal to 1227±23 at approximately 1 MHz at an ambient temperature of approximately 22° C.

For a piezoelectric unit 17 with a square electrode area of 90.25 mm, and thickness 1.96 mm, this yields a nominal capacitance at approximately 1 MHz of 500 pF.

An estimate for the variation in the dielectric constant of Pz27 over the temperature range −18° C. to +85° C. can be inferred from a plot of relative dielectric constant for Pz27 and other PZT products as a function of temperature.

Such data indicates that the capacitance would change by a total of approximately 32% over the −18° C. to +85° C. temperature range, relative to its value at ~25° C. with the capacitance increasing with increasing temperature. Therefore an increase in capacitance of ~160 pF could be expected for the Pz27 transducer over the temperature range −18° C. to +85° C.

A circuit simulation undertaken by the applicant has shown a temperature compensating capacitor to be suitable for mitigating the variation in transducer performance with temperature.

Figure 6:
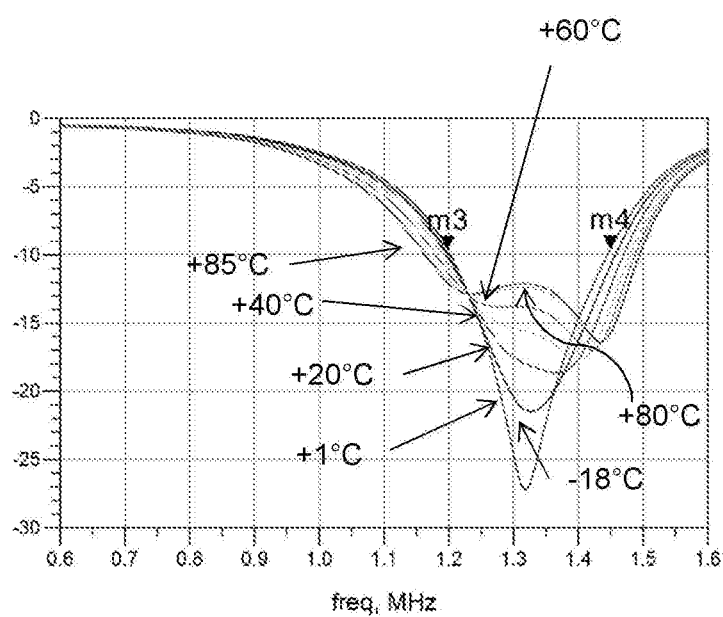
FIG. 6 is a graph showing plots of calculated electrical return loss for a transducer according to FIG. 5 over a range of temperatures.

The results of such simulation of the electrical loss of the transducer 30 over a range of temperatures are shown in FIG. 6. It is apparent that as temperature varies, the centre frequency of the less than 9.54 dB return loss response remains approximately constant, centred around 1.3 MHz and with bandwidth of at least 250 kHz extending at least from between approximately 1.2 MHz and 1.45 MHz.

Thus the stability of the matched centre frequency and overlapping bandwidth at all temperatures has been increased over a broader range of temperatures. The significant temperature dependent dispersion in the reactive electrical impedance of the transducer that is evident in un-tuned transducers may be significantly cancelled out.

The overlapping bandwidth of 250 kHz above exceeds the at least ~160 kHz bandwidth sufficient to support robust communications at a data rate of ~16 kbps in an acoustic signal channel subject to high signal multipath.

However, whilst there is a greater bandwidth overlap and a reduction in the reactive response, there is non-negligible electrical resistance dispersion as temperature changes.

Results are shown illustrating this in Table 1 from the 85° C. and −18° C. responses.

Further, the resistive impedance of the resulting temperature compensated transducer is lowered, particularly at a temperature of −18° C., such that successful tuning of the transducer may not be achieved using a simple series inductor.

TABLE 1

The impedance response of a piezoelectric unit operating at approximately 1 MHz with and without a matching circuit 31 according to the first embodiment, including a temperature compensating capacitor of value approximately 280 pF at 40° C. and type N5600.

| Temp. | Un-tuned Piezoelectric unit | | Piezoelectric unit tuned as per First embodiment | |
|---|---|---|---|---|
| | Resistance | Reactance | Resistance | Reactance |
| 85° C. | 78 | 205 | 42 | 156 |
| −18° C. | 86 | 288 | 24 | 158 |

Figure 7:
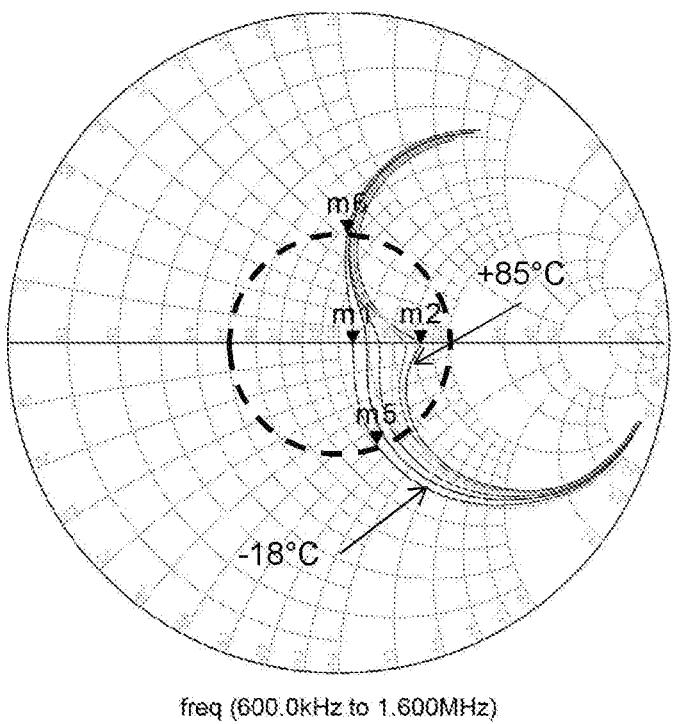
FIG. 7 is a Smith Chart plot of the electrical loss results of FIG. 6.

Such dispersion in the resistive impedance may be caused by the temperature compensating capacitor and is apparent from inspection of the Smith Chart plot of FIG. 7.

Referring to FIG. 8, a transducer according to a second embodiment of the invention is shown generally at 20.

The transducer 20 comprises a signal generator 22, a matching network 21, and a piezoelectric unit 17.

The signal generator 22 is defined as having an impedance of 50Ω and is operable to generate any one of a number of signals and in particular, is able to generate a signal having a centre-frequency of approximately 1 MHz with a bandwidth of greater than 160 kHz.

The piezoelectric unit 17 comprises a piezoelectric element 13 mounted between a driving electrode 12 and a ground electrode 14. The electrode/piezoelectric unit 17 has characteristics similar to a capacitor whose capacitance varies with temperature.

The piezoelectric element 13 is formed from a PZT ceramic material of thickness 1.47 mm with an electrode of dimension 9.5×9.5 mm square; however other shapes and dimensions of element 13 are possible without compromising the frequency match.

In particular the PZT material used in the element 13 may be Pz27 as supplied by Meggit Sensing Systems, Meggitt A/S, Hejrekovvej 18A, DK-3490 Kvistgaard, Denmark; (www.meggitt.com).

The matching network 21 comprises a series capacitor 26, a first shunt inductor 25, a series inductor 23, a second shunt inductor 27, and a shunt temperature compensating capacitor 28.

The matching network 21 is arranged to receive as input, the output from the signal generator 22. As such, the output of the signal generator 22 is fed into the series capacitor 26. The output of the series capacitor 26 is fed into two parallel paths, the first of which comprises only the first shunt inductor 25 before going to ground. The second path comprises the series inductor 23 and three further parallel paths. The output of the inductor 23 is fed into each of these three further paths. The first further path comprises the second shunt inductor 27, the second further path comprises the shunt capacitor 28, and the third further path comprises the electrode/piezoelectric unit 17. The output of each of the three further paths is connected to ground.

The matching network 21 is tuned so as to tend to maximise the electrical bandwidth over which the electrical return loss is reduced to better than 10 dB given: the impedance of the signal generator 22 which is 50 Ohm; the desired centre-frequency and bandwidth of the overall transducer 20, which centre frequency is approximately 1 MHz; and the impedance of the piezoelectric unit 17.

The shunt temperature compensating capacitor 28 is selected to have a dynamic capacitance with temperature that changes to oppose the changes in the capacitance of the piezoelectric unit 17.

Reducing the capacitance of the temperature compensating capacitor 28 tends to increase the bandwidth of the transducer 20. Accordingly a capacitor 28 is selected with a dielectric that tends to have as large a temperature coefficient as feasible of the correct sign.

The capacitance of the shunt temperature compensating capacitor 28 is approximately 280 pF (at a reference temperature of 40° C.) and was fabricated using a N5600 dielectric. Such a capacitance of the capacitor 28 was selected by the applicant after investigation of its dispersion reduction properties; this capacitor, when analysed in isolation tends to reduce the impedance dispersion as temperature varies.

For the PZT transducers considered in the first and second embodiments at least, this coefficient should be negative. Temperature compensating capacitors using an N5600 dielectric were used because this dielectric has a particularly high negative temperature coefficient.

Thus the performance of the transducer can be substantially constant as the temperature of the surrounding environment, and hence the transducer, varies. There is minimal need to alter the signal (e.g. to change the centre frequency) to enable a signal to be efficiently transmitted or received at a given temperature. It also enables separate transducer assemblies operating at different ambient temperatures to communicate efficiently.

Figure 9:
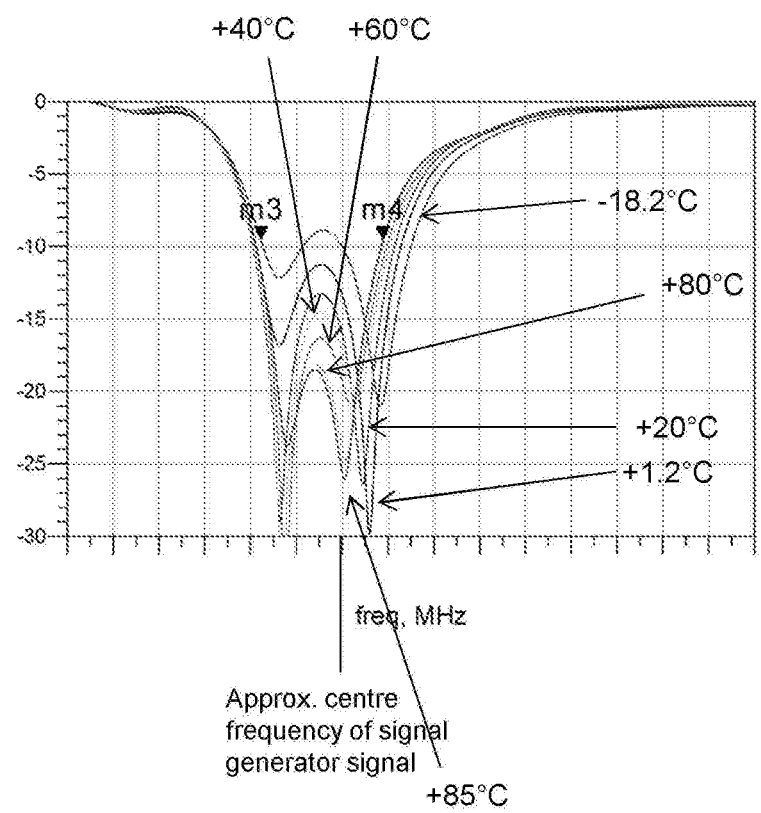
FIG. 9 is a graph showing plots of measured electrical return loss as may be obtained from a transducer according to FIG. 8 operating over a range of temperatures.

Referring to FIG. 9, there is shown a representative set of experimental measurements, this time based around the second embodiment of the invention as shown in FIG. 8, where the centre-frequency of the system is approximately 1 MHz.

It can be seen that regardless of the temperature, the ~10 dB return loss bandwidths all approximately overlap except for the −18° C. result.

It can be seen that the overlapping bandwidth is approximately 270 kHz, which exceeds the at least ~160 kHz bandwidth sufficient to support robust communications at a data rate of ~16 kbps in an acoustic signal channel subject to high signal multipath.

FIG. 10, is a Smith Chart plot representative of the impedance dispersion of the second transducer embodiment 20 with a compensating capacitance of approximately 280 pF (at 40° C.).

Comparing the impedance dispersion of second embodiment 20 (e.g. FIG. 10) with that of first embodiment of the transducer 30 (see FIG. 7), the resistance component appears to be similarly prone to dispersion (i.e. the plots at different temperatures are spaced around the constant resistance circles). Further, the reactance component appears to be more prone to dispersion in the second embodiment 20 (i.e. the plots are different temperatures are displaced along the constant reactance lines, which are orthogonal to the constant resistance circles).

However, the applicant has determined that surprisingly the dispersion effect in the second embodiment 20, i.e. as shown in FIG. 10, may be further tuned to mitigate this effect.

In particular a variant on the second embodiment 20 may be provided where an alternative shunt compensating capacitor 28 is provided in network 20 which capacitor has a comparatively large capacitance of approximately 340 pF (at a reference temperature of 40° C.). The other component values in network 20 are unchanged. This capacitance is greater than the compensating capacitance of approximately 280 pF discussed above. Recalling that the approximately 280 pF capacitor was selected because it was ascertained to mitigate the effect of temperature drift at the piezoelectric unit 17, it is surprising that the higher capacitance of approximately 340 pF tends to lead to a less dispersed temperature performance.

A representation of the approximate smith charts which occur when such an approximately 340 pF capacitor is used is shown in FIG. 11. The region R shows the bounds in which the frequency plot for at each temperature would occur.

The frequency plot of the loss at each temperature between 85° C. and −18.2° C. is now centred around 1 MHz and has a bandwidth below 9.54 dB of at least 160 MHz. Thus the dispersion effect is mitigated and a sufficient band of frequencies is comfortably contained within the 2:1 VSWR circle 100.

Moreover the applicant has determined that at higher temperatures, including those up to 150° C., the frequency plot remains within the 2:1 VSWR circle 100.

Further, adding such an approximately 340 pF capacitor 28 and minimising the dispersion could be expected to give the transducer a degree of tolerance which would enable the system to use capacitors and inductors which deviate slightly from their stated capacitance or inductances.

The embodiments of the invention discussed above provide matching networks adapted for certain transducer characteristics and in particular, the matching networks are arranged to be tuned to the 50Ω signal generator generating a signal at either 1 MHz or 3.5 MHz (3.5 MHz signals may be expected to have a transformer present), to the capacitance of the electrical load (i.e. the piezoelectric unit 17) in such a way as to preserve the desired common bandwidth at the predetermined temperature range of the system, namely greater than 160 kHz.

For other arrangements of signal generator, operating frequency characteristics, and piezoelectric capacitance, the shunt and series inductors and capacitors would most likely have different inductances. However it would be within the ambit of the skilled man to tune the matching network of FIG. 8 or FIG. 5 by altering the circuit topology and thereby adapt the network to provide further embodiments of the invention without any inventive activity.

Still further, it would be within the ambit of the skilled man to tune the matching network of FIG. 8, or FIG. 5 to loads other than the signal generator 22. In particular, if the signal generator 22 were replaced with a signal amplifier (if the transducer were used to receive rather than transmit data), the skilled man would be able to select suitable inductors and capacitors, arranged as per the matching network 21 or 31 but having suitable, possibly different, values, in order to feed signals between the piezoelectric unit 17 and the signal amplifier.

It is expected that PZT materials other than those discussed above would be suitable. Pz27 has a lower temperature dependent dispersion of the electrical impedance than for example PZ5A4 grade PZT.

For the Meggitt Pz27 material the change in capacitance due to changes is its relative dielectric constant with temperature is smaller than is the Morgan PZ5A4 material. For example the Meggitt Pz27 material varies by ~28% over the temperature range −18° C. to +85° C. The corresponding variation for the Morgan material is ~38%.

The invention claimed is:

1. An acoustic transducer for communications within an operational bandwidth, the transducer comprising:
    a piezoelectric element having a dielectric constant that varies with temperature;
    a driving electrode at the surface of the piezoelectric element; and
    a matching network, having a natural frequency at a given temperature, and operable to transfer a signal from a signal generator to the piezoelectric element, the matching network being connected to the driving electrode, wherein the matching network comprises
        a temperature compensating capacitor connected in parallel with the piezoelectric element,
        a first shunt inductor connected in parallel with the piezoelectric element,
        a second shunt inductor connected in parallel with the piezoelectric element,
        a first series inductor operably connected across the first and second shunt inductors, and
        a series capacitor operably connected to the second shunt inductor.

2. The acoustic transducer according to claim 1, wherein the temperature compensating capacitor is configured such that within a certain temperature range a change in dielectric constant of the temperature compensating capacitor, in response to temperature change, is substantially equal and opposite to a change in dielectric constant of the piezoelectric element.

3. The acoustic transducer according to claim 1, wherein the capacitance of the temperature compensating capacitor is less than or equal to 1000 pF at 40° C.

4. The acoustic transducer according to claim 1, wherein the matching network is tuned to substantially minimise the electrical loss over the operational bandwidth given impedance of the signal generator and capacitance of the driving electrode and piezoelectric element.

5. The acoustic transducer according to claim 1, wherein the piezoelectric element comprises a lead zirconium titanate (PZT) material.

6. The acoustic transducer according to claim 1, wherein the natural frequency of the matching network is substantially constant over a temperature range of at least 150° C. or over a temperature range that includes −20° C. and 85° C.

7. The acoustic transducer according to claim 1, the acoustic transducer having a centre-frequency between 0.5 MHz and 1.5 MHz and/or an operational bandwidth that is it at least 160 KHz.

8. The acoustic transducer according to claim 1, wherein the temperature compensating capacitor has a capacitance greater than the capacitance that would be required to effect, within a certain temperature range, a change in dielectric constant in response to temperature change that is substantially equal and opposite to the change in dielectric constant of the piezoelectric element.

9. The acoustic transducer according to claim 1, wherein the temperature compensating capacitor operates to counteract temperature-induced changes to the dielectric constant of the piezoelectric element such that the natural frequency is substantially constant over a range of temperatures.

10. An acoustic transducer communications arrangement comprising:
    a first acoustic transducer according to claim 1, mounted on a first surface of a substrate;
    a second acoustic transducer for communications within the operational bandwidth, the second acoustic transducer including
        a signal amplifier for amplifying the signal at the centre-frequency within the operational bandwidth, a second piezoelectric element having a dielectric constant that varies with temperature, a second driving electrode at the surface of the second piezoelectric element, a second matching network, having a natural frequency at a given temperature, and operable to transfer the signal from the piezoelectric element to the signal amplifier, the matching network being connected to the driving electrode, wherein the matching network comprises a temperature compensating capacitor connected in parallel with the piezoelectric element, and wherein the first and second acoustic transducers are arranged such that the piezoelectric element of the first acoustic transducer is aligned for acoustic communication with the second piezoelectric element of the second acoustic transducer.

11. A method of communication between a first environment having a first dynamic temperature range, and a second environment having a second dynamic temperature range, the environments being separated by an intermediate barrier, the method comprising:

mounting a first acoustic transducer according to claim 1 in the first environment; and mounting a second acoustic transducer according to claim 1 in the second environment;

such that the acoustic transducers are configured to communicate with one another across the intermediate barrier.

12. A matching network for an acoustic transducer, the acoustic transducer being operable to communicate at a centre-frequency and across an operational bandwidth, the acoustic transducer comprising a piezoelectric element having a dielectric constant which varies with temperature, the transducer having a natural frequency at a given temperature, and being operable to transfer a signal between an electrical load and the piezoelectric element, wherein the matching network comprises:

a temperature compensating capacitor connected in parallel with the piezoelectric element, the temperature compensating capacitor being for counteracting temperature-induced changes to the dielectric constant of the piezoelectric element such that the natural frequency of the transducer is substantially constant over a range of temperatures;

a first shunt inductor connected in parallel with the piezoelectric unit; and a second shunt inductor connected in parallel with the piezoelectric unit.

13. The matching network according to claim 12, wherein the matching network further includes: a first series inductor operably connected across the first and second shunt inductors; and a series capacitor operably connected to the second shunt inductor.

14. An acoustic transducer for communications within an operational bandwidth, the transducer comprising:

a piezoelectric element having a dielectric constant that varies with temperature;

a driving electrode at the surface of the piezoelectric element; and a matching network, having a natural frequency at a given temperature, and operable to transfer an input signal to the piezoelectric element, the matching network being connected to the driving electrode, wherein the matching network includes a temperature compensating capacitor connected in parallel with the piezoelectric element, a first shunt inductor connected in parallel with the piezoelectric element, a second shunt inductor connected in parallel with the piezoelectric element, a first series inductor operably connected across the first and second shunt inductors, and a series capacitor operably connected to the second shunt inductor.

15. The acoustic transducer according to claim 14, wherein the temperature compensating capacitor is configured such that within a certain temperature range a change in dielectric constant of the temperature compensating capacitor, in response to temperature change, is substantially equal and opposite to a change in dielectric constant of the piezoelectric element.

16. The acoustic transducer according to claim 14, wherein the capacitance of the temperature compensating capacitor is less than or equal to 1000 pF at 40° C.

17. The acoustic transducer according to claim 14, wherein the piezoelectric element comprises a lead zirconium titanate (PZT) material.

18. The acoustic transducer according to claim 14, wherein the natural frequency of the matching network is substantially constant over a temperature range of at least 150° C.

19. The acoustic transducer according to claim 1, further comprising the signal generator, wherein the series capacitor is operably connected between the signal generator and the second shunt inductor.

20. The acoustic transducer according to claim 14, further comprising a signal generator, wherein the series capacitor is operably connected between the signal generator and the second shunt inductor.

* * * * *